Feb. 9, 1926. 1,572,747
P. R. MINAHAN
HEATER FOR AUTOMOBILES
Filed Dec. 8, 1924 2 Sheets-Sheet 2
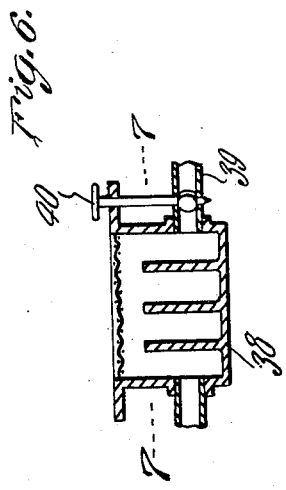
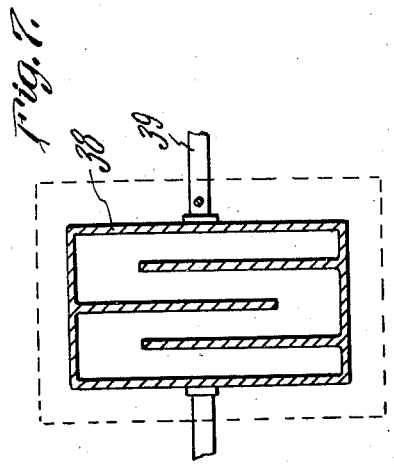
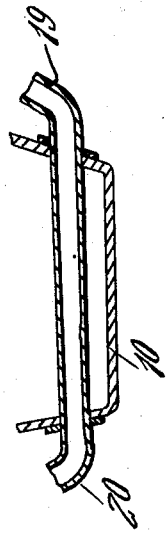
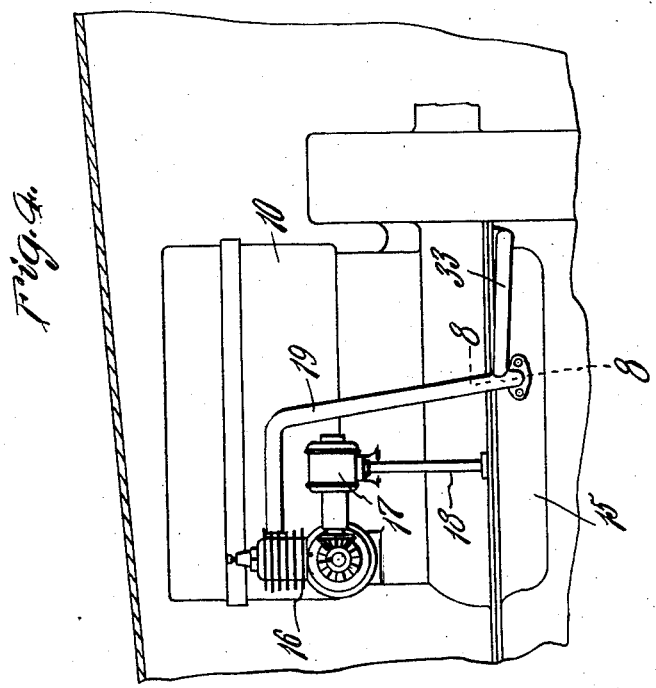
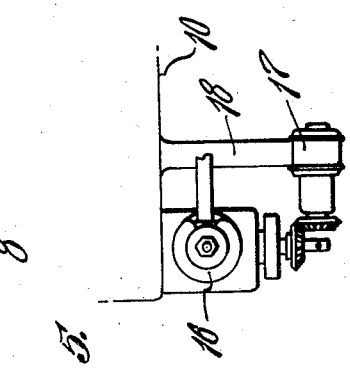
P. R. Minahan
INVENTOR
BY Victor J. Evans
ATTORNEY Patented Feb. 9, 1926.

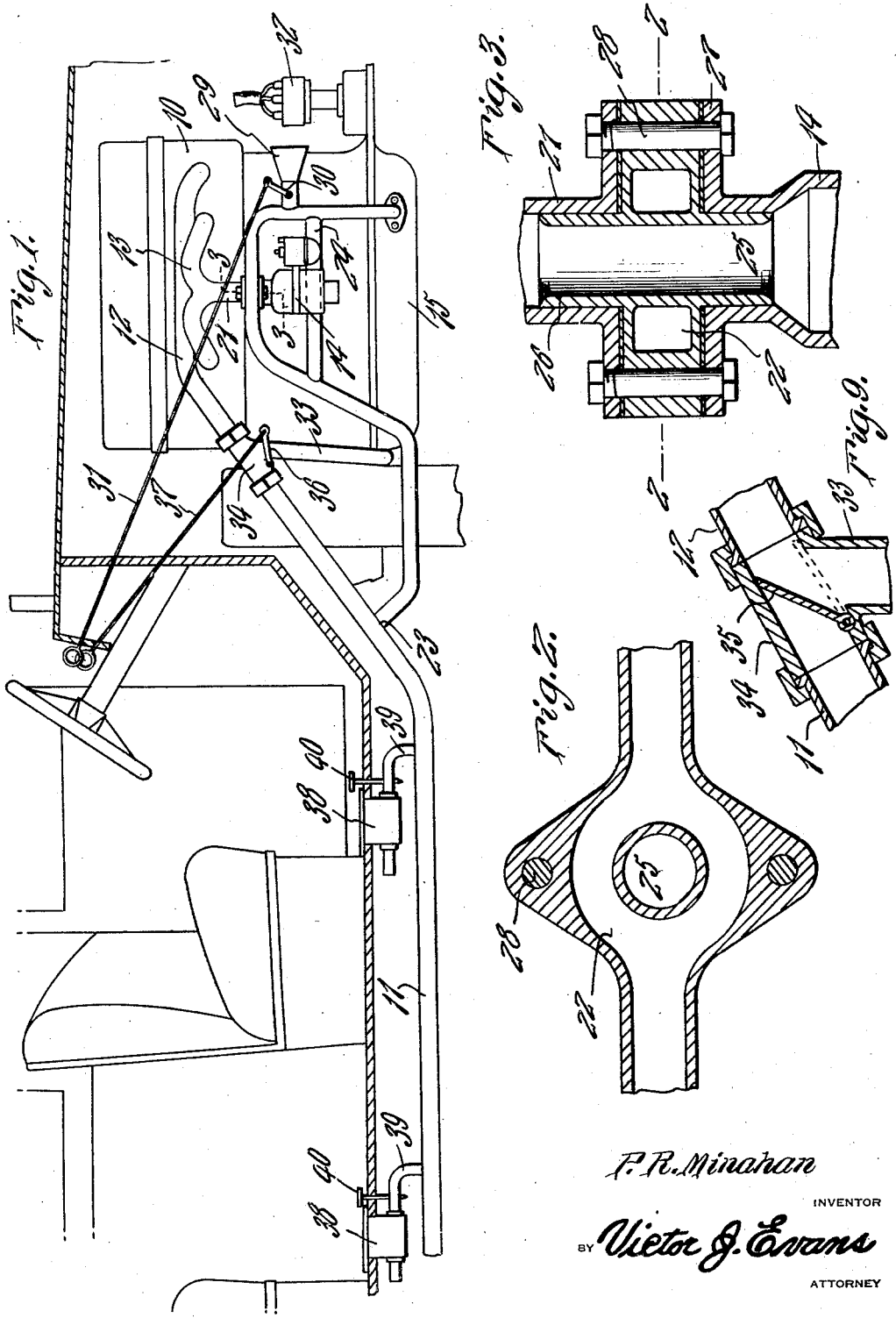

1,572,747

UNITED STATES PATENT OFFICE.

PATRICK R. MINAHAN, OF GREEN BAY, WISCONSIN.

HEATER FOR AUTOMOBILES.

Application filed December 8, 1924. Serial No. 754,693.

*To all whom it may concern:*

Be it known that I, PATRICK R. MINAHAN, a citizen of the United States, residing at Green Bay, in the county of Brown and State of Wisconsin, have invented new and useful Improvements in Heaters for Automobiles, of which the following is a specification.

This invention relates to improvements in automobiles and has particular relation to means for heating and softening the lubricating oil of the engine in cool weather, whereby starting of the engine will be facilitated and the efficiency of the engine in operation increased.

Another object of the invention is the provision of heating means which is applicable to an automobile for the purpose of heating the oil prior to starting the engine and which may also be utilized for drying various parts of the ignition system and for heating the interior of the automobile.

To this end, the invention aims to provide an internal combustion engine which is auxiliary to and independent of the main engine of the automobile and which may be operated prior to the operation of such main engine to initially heat the lubricant and fuel of the main engine so that when the latter is started proper lubrication will be assured.

With the above and other objects in view, the invention further includes the following novel features and details of construction, to be hereinafter more fully described, illustrated in the accompanying drawings and pointed out in the appended claim.

In the drawings:—

Figure 1 is a fragmentary side elevation partly in section showing a portion of an automobile with the invention applied.

Figure 2 is a section taken substantially on the line 2—2 of Figure 3.

Figure 3 is an enlarged section taken substantially on the line 3—3 of Figure 1.

Figure 4 is a fragmentary side elevation looking at the side of the engine opposite that shown in Figure 1.

Figure 5 is a fragmentary plan view showing the manner of mounting the auxiliary engine and its starter.

Figure 6 is a fragmentary sectional view of the automobile heater.

Figure 7 is a section on the line 7—7 of Figure 6.

Figure 8 is an enlarged fragmentary section on the line 8—8 of Figure 4.

Figure 9 is an enlarged fragmentary section showing the valve for controlling the exhaust from the main engine.

Referring to the drawings in detail wherein like characters of reference denote corresponding parts, the reference character 10 indicates the engine of an automobile to which the invention is shown as applied and which will be hereinafter referred to as the main engine. The exhaust pipe of this engine is indicated at 11 and extends from the exhaust manifold 12, while the intake manifold is indicated at 13 and is connected to the carbureter 14. The crank case of the engine 10 is indicated at 15.

All of the foregoing is of the usual or any preferred construction, the invention being applicable to automobiles of any type.

The invention resides in the provision of an auxiliary engine which is indicated at 16 and which may be suitably mounted upon the housing of the main engine 10, or any other convenient place. The engine 16 is considerably smaller than the engine 10 and is preferably provided with an independent starter 17 which is suitably supported as indicated at 18 and this starter may be controlled from the driver's seat as may also the speed and priming of the engine 16.

The exhaust from the engine 16 is conveyed through a pipe 19 to the crank case 15 of the engine 10 and through this crank case outward through a pipe 20. The fuel for the engine 10 is carried by a pipe 21, which passes through the pipe 20 and the latter is enlarged at the point of passage and shaped to provide a heating chamber 22 which entirely surrounds the pipe 21. The pipe 20 is then extended rearward and communicates with the exhaust pipe 11 of the main engine as indicated at 23 in Figure 1 of the drawings. A branch pipe 24 connects the two legs of the pipe 20 and extends around the carbureter 14, so that the exhaust gases from the engine 16 will warm the fuel within the carbureter and will further warm and soften the fuel mixture as it passes through the pipe 21 to the intake manifold 13.

For the purpose of providing connection between the intake manifold and the carbureter, the chamber 22 is provided with a central passage 25 from which extends oppositely disposed thimbles 26, one of which enters the upper end of the carbureter 14 and the other the lower end of the intake manifold, so that the passage 25 forms a continuation of the manifold. The carbureter 14 and manifold are provided with flanges 27 which are secured to the upper and lower walls of the chamber 22 by means of bolts 28 as illustrated in Figures 2 and 3 of the drawings.

The pipe 20 is provided with an extension 29 which is controlled by a butterfly valve whose stem carries an arm 30, while connected to this arm is a rod 31 which leads to the instrument board of the automobile, whereby the pipe extension 29 may be controlled for the supply of exhaust gases to the distributor 32 of the engine 10.

Extending from the pipe 19 around the crank case 15 is a pipe 33 which leads to and communicates with the exhaust pipe 11 of the engine 10 as shown at 34 in Figures 1 and 9 of the drawings. At this point the exhaust pipe 11 is provided with a valve 35 whose stem has secured thereto an arm 36 which is controlled from the instrument board of the automobile by means of a rod 37. When the valve is in the full line position shown in Figure 9 of the drawings the exhaust gases will be directed into the pipe 33 and will pass through this pipe into the pipe 19 and through the crank case 15. When the valve 35 is in the position shown by the dotted lines in Figure 9 the exhaust gases will pass out through the pipe 11 in the usual manner.

If desired the automobile may be equipped with radiators 38 which communicate with the pipe 11 through pipes 39, the heat to the radiators being controlled by a foot operated pedal 40.

It is to be understood that the engine 16 is separate and distinct from the engine 10, is provided with its own individual starter which may be operated from the usual battery or from a separate battery. It is preferred to provide this engine 16 with a special fuel supply pipe which may contain a high test gas or ether or any other highly combustible fluid and while an automatic starter 17 is provided for starting the engine 16, it is of course obvious that the engine may be manually started.

The invention is susceptible of various changes in its form, proportions and minor details of construction and the right is herein reserved to make such changes as properly fall within the scope of the appended claim.

Having described the invention what is claimed is:—

In an automobile, the combination with a main internal combustion engine, an auxiliary internal combustion engine, a pipe for conducting the exhaust gases from the auxiliary engine through the crank case of the main engine, a pipe leading from said exhaust pipe to the exhaust pipe of the main engine to carry off said gases, a pipe establishing communication between the exhaust pipe of the auxiliary engine and the exhaust pipe of the main engine in advance of the point of said communication and means whereby exhaust from the main engine may be directed into the exhaust pipe of the auxiliary engine.

In testimony whereof I affix my signature.

PATRICK R. MINAHAN.